(12) United States Patent
Kawamura et al.

(10) Patent No.: US 10,049,635 B2
(45) Date of Patent: Aug. 14, 2018

(54) SINGLE-SIDED SOURCE AND GATE DRIVER ARRANGEMENT FOR DISPLAY DEVICE

(71) Applicant: Panasonic Liquid Crystal Display Co., Ltd., Hyogo (JP)

(72) Inventors: Tetsuya Kawamura, Hyogo (JP); Tetsurou Izawa, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 104 days.

(21) Appl. No.: 15/185,746

(22) Filed: Jun. 17, 2016

(65) Prior Publication Data

US 2016/0293128 A1    Oct. 6, 2016

Related U.S. Application Data

(63) Continuation of application No. PCT/JP2014/000937, filed on Feb. 21, 2014.

(30) Foreign Application Priority Data

Dec. 20, 2013    (JP) ................................. 2013-263831

(51) Int. Cl.
   *G09G 3/36* (2006.01)
   *G02F 1/1345* (2006.01)

(52) U.S. Cl.
   CPC ....... *G09G 3/3674* (2013.01); *G02F 1/13452* (2013.01); *G09G 3/3685* (2013.01); *G02F 2001/13456* (2013.01); *G09G 2300/0408* (2013.01); *G09G 2300/0426* (2013.01); *G09G 2310/0281* (2013.01); *G09G 2320/0223* (2013.01); *G09G 2340/145* (2013.01)

(58) Field of Classification Search
   CPC .................................................... G09G 3/3688
   See application file for complete search history.

(56) References Cited

U.S. PATENT DOCUMENTS

| | | | |
|---|---|---|---|
| 6,496,238 B1 | 12/2002 | Greene et al. |
| 6,654,449 B1 | 11/2003 | Greene et al. |
| 2002/0000540 A1 | 1/2002 | Smither-Kopperi |
| 2002/0051111 A1 | 5/2002 | Greene et al. |
| 2002/0154076 A1 | 10/2002 | Greene et al. |

(Continued)

FOREIGN PATENT DOCUMENTS

| | | |
|---|---|---|
| JP | 2003-520994 | 7/2003 |
| JP | 2012-32608 | 2/2012 |

OTHER PUBLICATIONS

International Search Report dated Apr. 22, 2014 in corresponding International Application No. PCT/JP2014/000937.

*Primary Examiner* — Sepehr Azari

(74) *Attorney, Agent, or Firm* — Wenderoth, Lind & Ponack, L.L.P.

(57) ABSTRACT

A display device includes source drivers, at least one gate driver, a first substrate, a second substrate, gate lines, source lines, lead-out lines and connection parts, wherein the gate signals are emitted from the gate driver to the gate lines via the lead-out lines and the connection parts, the source drivers include a first source driver and a second source driver, the second source driver being spaced apart from the first source driver in a first direction, and the gate driver is located between the first source driver and second source driver in the first direction.

6 Claims, 15 Drawing Sheets

(56) References Cited

U.S. PATENT DOCUMENTS

| | | | | |
|---|---|---|---|---|
| 2003/0184703 A1* | 10/2003 | Greene | ................ | A01N 63/00 349/158 |
| 2006/0232738 A1* | 10/2006 | Lin | ..................... | G02F 1/1345 349/149 |
| 2008/0024407 A1* | 1/2008 | Yamaguchi | ......... | G02F 1/13452 345/87 |
| 2012/0026420 A1 | 2/2012 | Saitoh | | |

* cited by examiner

SINGLE-SIDED SOURCE AND GATE DRIVER ARRANGEMENT FOR DISPLAY DEVICE

CROSS-REFERENCE TO RELATED APPLICATION

This application is bypass continuation of international patent application PCT/JP2014/000937, filed Feb. 21, 2014 designating the United States of America, the entire disclosure of which is incorporated herein by reference. Priority is claimed based on Japanese patent application JP 2013-263831, filed Dec. 20, 2013, the entire disclosure of which is incorporated herein by reference in its entirety.

TECHNICAL FIELD

The present disclosure relates to a display device including a display area that displays images.

BACKGROUND

A liquid crystal display device generally includes an outer substrate and an inner substrate. The outer substrate includes a display area which displays images. The inner substrate faces the outer substrate. The display device further includes a wiring portion, a gate driver and a source driver. The wiring portion includes gate lines, source lines and pixels. The gate driver emits gate signals to the gate lines. The source driver emits source signals to the source lines as image signals. The pixels adjust light according to gate signals and source signals, enabling viewers to view images on the display area.

The gate driver and the source driver are provided on the inner substrate. The wiring portion and the display area are formed in an overlapping area where the outer substrate and the inner substrate overlap. The gate driver and the source driver are located in an area outside of the overlapping area.

A prior art discloses that gate drivers and source drivers are disposed adjacent to four sides of a rectangular shape of the overlapping area. Techniques of disposing the gate drivers and the source drivers disclosed in the prior art may require the inner substrate having a longer side in both a longitudinal and a lateral direction. This may make a ratio of an area of the display area to a whole area of the display device small, which conflicts with the needs of consumers who desire a big display area on a small display device (See Japanese Unexamined Patent Application Publication No. 2012-32608).

Various research about wiring structures has been conducted to fill the needs of consumers who desire a big display area on a small display. However, some problems remain to be solved, because these wiring structures confront problems caused by sharp positional fluctuation of wiring resistance, which can lead to low quality of images.

SUMMARY

The present disclosure has been achieved in order to solve the above-described problems, and an object thereof is to provide a small display device with a big display area to display high quality images.

In one general aspect, the instant application describes a display device that includes source drivers for emitting source signals, at least one gate driver for emitting gate signals, a first substrate having a display area for displaying images, the images represented by source signals and gate signals, a second substrate including a first area overlapping with the first substrate, and a second area on which the source drivers and the at least one gate driver are attached. Gate lines extend in a first direction on the first area, source lines extend in a second direction which is different from the first direction, and lead-out lines extend in the second direction. Connection parts are provided, each of the connection parts connecting one of the lead-out lines to one of the gate lines. The gate signals are emitted from the gate driver to the gate lines via the lead-out lines and the connection parts. The source drivers include a first source driver and a second source driver, the second source driver being spaced apart from the first source driver in the first direction. The gate driver is located between the first source driver and second source driver in the first direction.

According to the present disclosure, a display device with a big display area to display high quality images is provided.

DETAILED DESCRIPTION

The preferred embodiments of the present disclosure are described in detail referring to the attached drawings. The present embodiments are to be considered in all respects as illustrative and not restrictive. Any terms describing a direction including "upper", "lower", "left" and "right" are written only for concise explanation, and thus such terms should not be interpreted as restrictive.

First Embodiment

A sharp fluctuation in resistance ratio according to image signals may deteriorate a quality of images displayed in a display area. Design principles which prevent resistance ratio from fluctuating sharply and allow a big display area are explained in association with this first embodiment.

Figure 1:
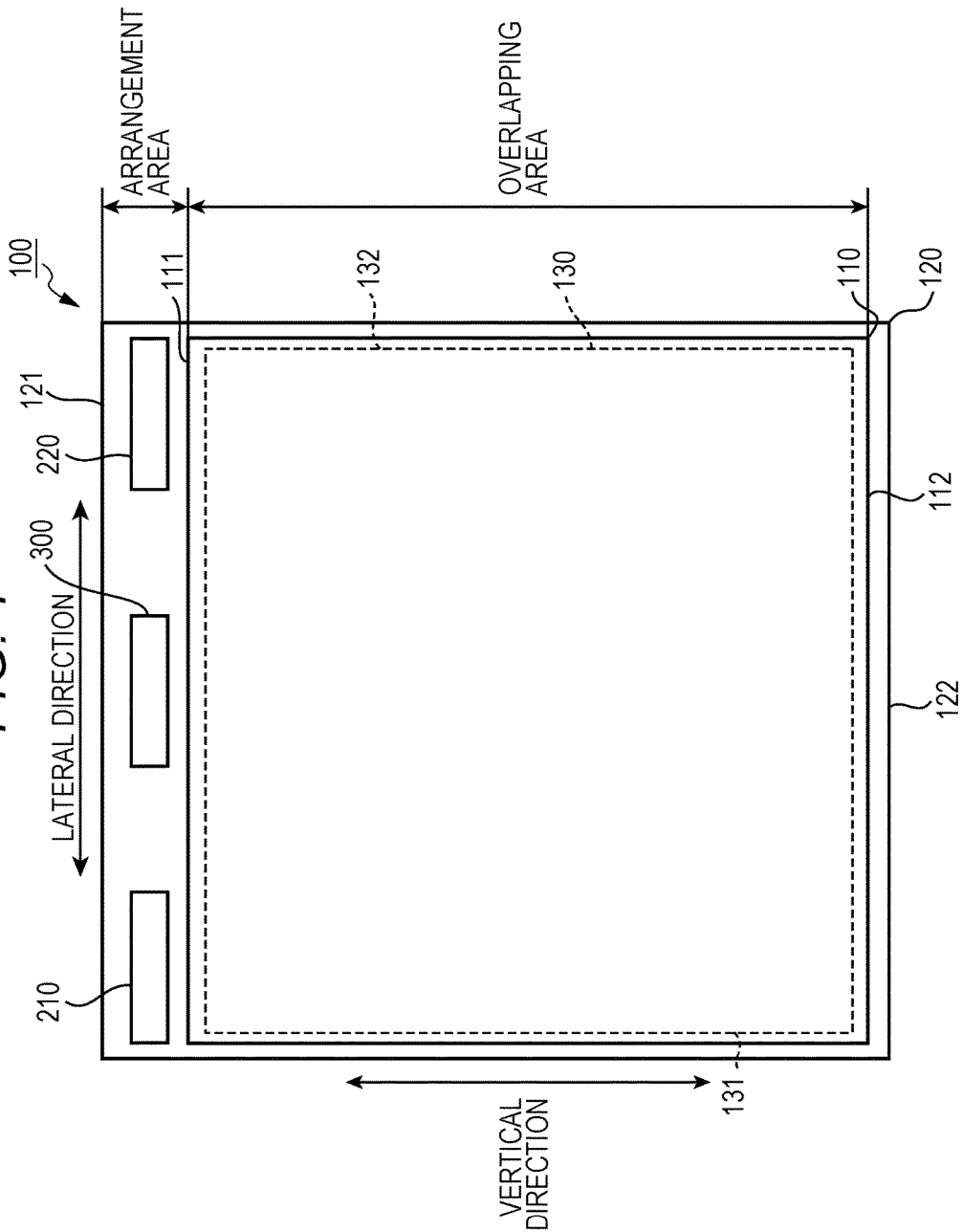
FIG. 1 is a schematic front view of a display device of a first embodiment.

FIG. 1 is a schematic front view of a display device of the first embodiment. A display device 100 is explained with reference to FIG. 1.

The display device 100 includes an outer substrate 110, an inner substrate 120, a left source driver 210, a right source driver 220 and a gate driver 300. The outer substrate 110 includes a display area 130. The display device 100 can display images on the display area 130.

A longitudinal side of the outer substrate 110 is shorter than that of the inner substrate 120. The inner substrate 120 is placed to face the outer substrate 110. The outer substrate 110 includes an upper edge 111 and a lower edge 112, the lower edge 112 opposing the upper edge 111 as shown in FIG. 1. Both of the upper edge 111 and the lower edge 112 extend laterally. The inner substrate 120 includes an upper edge 121 and a lower edge 122, the lower edge 122 opposing the upper edge 121 as shown in FIG. 1. Both of the upper edge 121 and the lower edge 122 extend laterally. The outer substrate 110 is provided above the inner substrate 120 in such a way that a gap between the two lower edges 112, 122 is shorter than a gap between the two upper edges 111, 121. In a following description, an area between the upper edge 111 of the outer substrate 110 and the upper edge 121 of the inner substrate 120 is referred as an arrangement area. An area where the outer substrate 110 and the inner substrate 120 overlap each other is referred as an overlapping area. In the present embodiment, the outer substrate 110 is exemplified as a first substrate. The inner substrate 120 is exemplified as a second substrate. The overlapping area is exemplified as a first area.

The left source driver 210, the right source driver 220 and the gate driver 300 are arranged on the arrangement area of the inner substrate 120. The right source driver 220 is spaced apart from the left source driver 210 in a lateral direction and is arranged to the right of the left source driver 210. The gate driver 300 is arranged between the left source driver 210 and the right source driver 220. The left source driver 210 and the right source driver 220 emit source signals to the display area 130 as image signals. The gate driver 300 emits gate signals to the display area 130. The display device 100 can display images on the display area 130 represented by source signals and gate signals. In the present embodiment, one of the left source driver 210 and the right source driver 220 is exemplified as a first source driver. The other of the left source driver 210 and the right source driver 220 is exemplified as a second source driver. The lateral direction is exemplified as a first direction.

Figure 2:
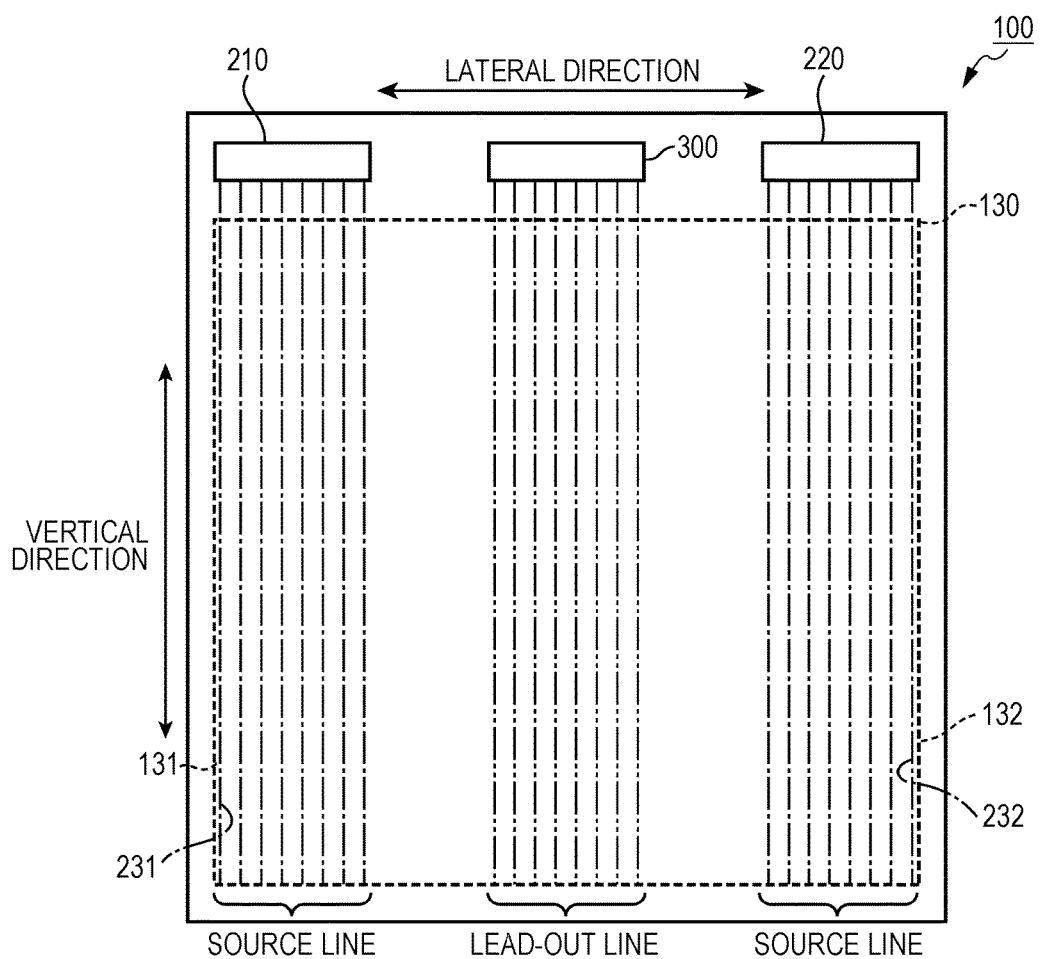
FIG. 2 is a schematic front view of the display device illustrated in FIG. 1.

FIG. 2 is a schematic front view of the display device 100. FIG. 2 is illustrated by removing the outer substrate 110 from the display device 100. The emission of source signals and gate signals is described with reference to FIG. 1 and FIG. 2.

The display area 130 includes a left edge 131 and a right edge 132, the right edge 132 opposing the ledge edge 131 as shown in FIG. 2. The left edge 131 and right edge 132 extend in the longitudinal direction and define a right and left boundary of the display area 130. In the present embodiment, one of the left edge 131 and the right edge 132 is exemplified as a first edge. The other of the left edge 131 and right edge 132 is exemplified as a second edge.

The source lines extend in the longitudinal direction on the display area 130 of the display device 100. The left source driver 210 emits source signals to source lines. The right source driver 220 emits source signals to source lines in the same way as the left source driver 210. In the present embodiment, the longitudinal direction is exemplified as a second direction.

The source lines to which the left source driver 210 emits source signals include a left source line 231 which is the closest to the left edge 131. The source lines to which the right source driver 220 emits source signals include a right source line 232 which is the closest to the right edge 132. In the present embodiment, one of the left source line 231 and the right source line 232 is exemplified as a first source line. The other of the left source line 231 and the right source line 232 is exemplified as a second source line.

The display device 100 includes lead-out lines extending in the longitudinal direction in the display area 130. The gate driver 300 emits gate signals to the lead-out lines.

Figure 3:
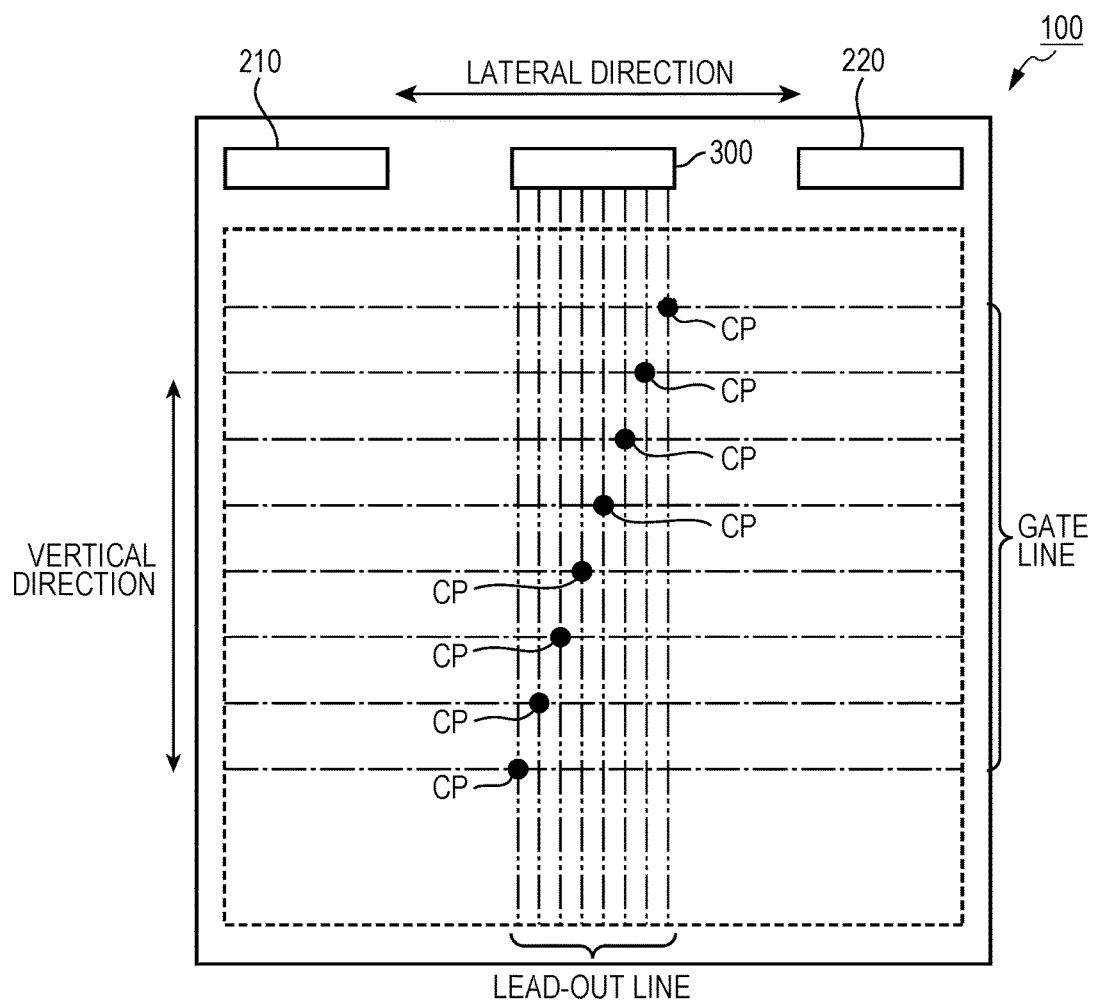
FIG. 3 is a schematic front view of the display device illustrated in FIG. 1.
Figure 4:
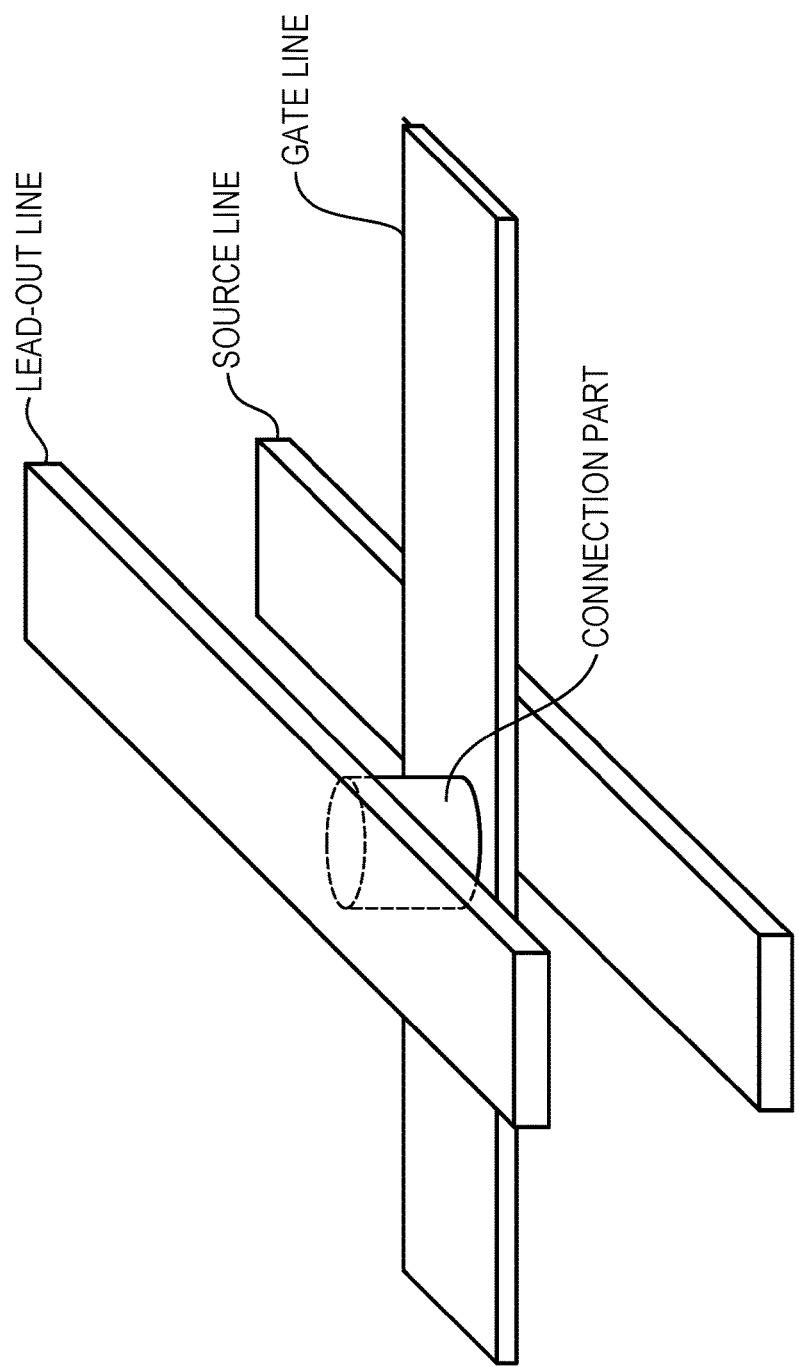
FIG. 4 is a perspective view schematically showing an exemplary wiring structure of the display device illustrated in FIG. 1.

FIG. 3 is a schematic front view of the display device 100. FIG. 4 is a perspective view schematically showing an exemplary wiring structure of the display device 100. FIG. 3 is illustrated by removing the outer substrate 110 from the display device 100. A transmission of gate signals is described with reference to FIG. 1, FIG. 3 and FIG. 4.

The display device 100 includes the gate lines and connection parts CP. A layer in which the gate lines are formed, a layer in which the lead-out lines are formed, and a layer in which the source lines are formed, are different from each other. The gate lines extend laterally, which is different from the longitudinally extending lead-out lines and source lines. One of the gate lines connects electrically to one of the lead-out lines via one of the connection parts CP. Thus, the gate signals are emitted to the gate lines from the gate driver 300 via the lead-out lines.

According to the design principle mentioned above, it is possible to achieve proper signal transmission which prevents sharp resistance fluctuation with respect to gate signals and source signals. If the positions of the gate driver and source drivers described above were to be switched, namely, if gate drivers were arranged at the positions of the left source driver 210 and the right source driver 220, and a source driver was arranged at the position of the gate driver 300, the fluctuation of resistance due to position with respect to the gate signals and the source signals would become larger. On the other hand, following the principle of the present embodiment described above, a resistance fluctuation is able to be kept to a minimum.

The principle of the present embodiment can be applied to a display device possessing more than two gate drivers. When source drivers are arranged at the positions of two ends of a group of drivers arranged laterally, the resistance fluctuation due to position can become small.

Second Embodiment

The design principle described with reference to the first embodiment may lead to gradual change of resistance with respect to image signals. Gradual change of resistance with respect to image signals is described with reference to the second embodiment.

Figure 5:
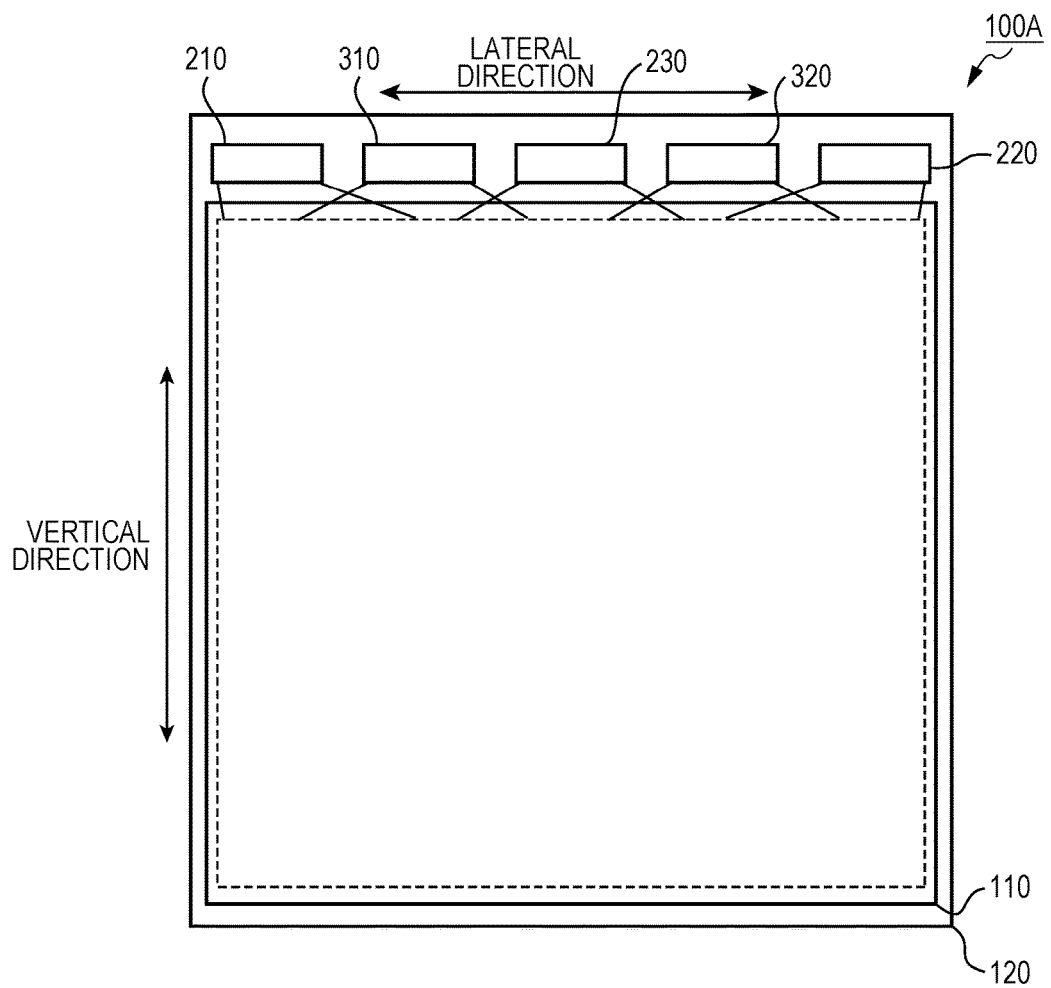
FIG. 5 is a schematic front view of a display device of a second embodiment.

FIG. 5 is a schematic front view of a display device 100A of the second embodiment. The display device 100A is described with reference to FIG. 5. Common reference numbers between the first embodiment and the second embodiment are labeled on elements which have the same or similar functions as that in the first embodiment. Thus, the description in the first embodiment is referred to for such elements.

Similar to the first embodiment, the display device 100A includes the outer substrate 110, the inner substrate 120, the left source driver 210 and the right source driver 220. The display device 100A further includes a central source driver 230 arranged between the left source driver 210 and right source driver 220. Similar to the left source driver 210 and the right source driver 220, the central source driver 230 emits source signals to source lines in the display area 130. The display device 100A further includes a left gate driver 310 and a right gate driver 320. The left gate driver 310 is arranged between the left source driver 210 and the central source driver 230. The right gate driver 320 is arranged between the right source driver 220 and the central source driver 230.

Figure 6:
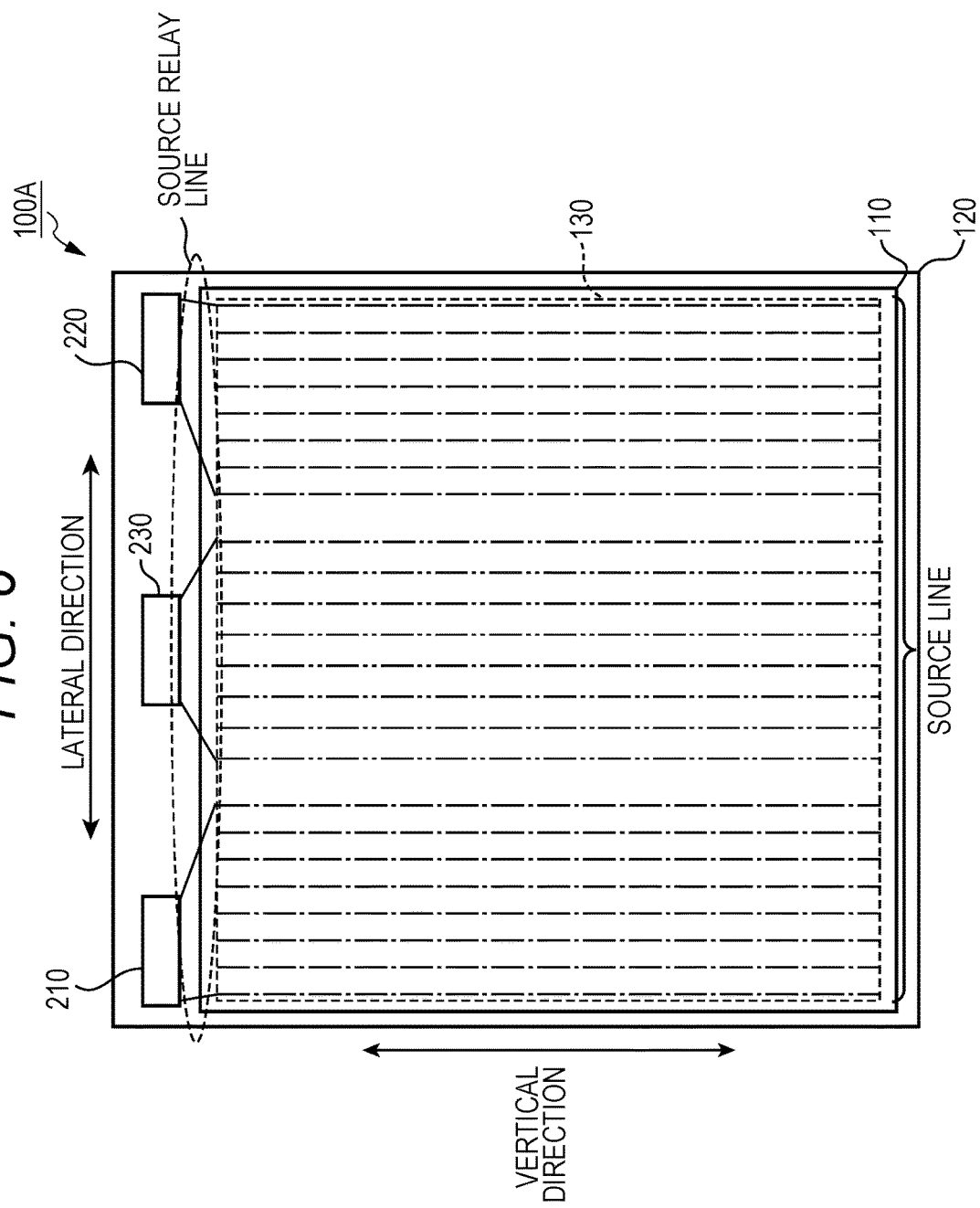
FIG. 6 is a schematic front view of the display device illustrated in FIG. 5.

FIG. 6 is a schematic front view of the display device 100A. A transmission of source signals is described with reference to FIG. 6.

Similar to the first embodiment, the source lines are arranged laterally in the display area 130. The display device 100A includes source relay lines which relay source signals from the left source driver 210, the central source driver 230 and the right source driver 220 to the source lines. An area where the source relay lines extend from the left source driver 210, an area where the source relay lines extend from the central source driver 230 and an area where the source relay lines extend from the right source driver expand in a fan-like shape from the left source driver 210, the central source driver 230 and the right source driver 220 to the display area 130.

Figure 7:
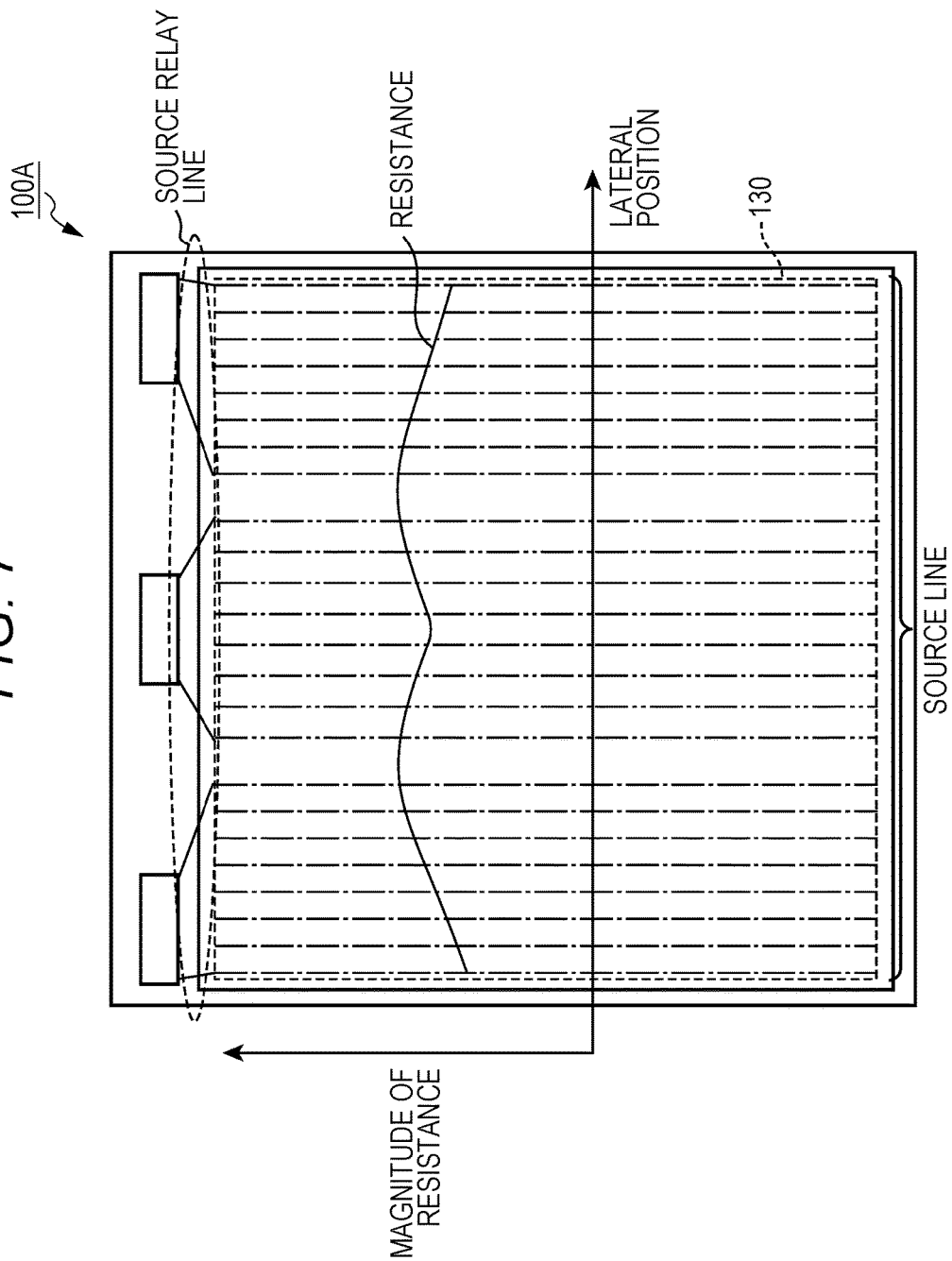
FIG. 7 is a schematic front view of the display device illustrated in FIG. 5.

FIG. 7 is a schematic front view of the display device 100A. The positional resistance fluctuation with respect to source signals is described with reference to FIG. 7.

A graph of resistance in lateral distribution with respect to source signals is illustrated in FIG. 7 along with the display device 100A. The curved line on the display area 130 represents a magnitude of resistance with respect to source signals.

The resistance with respect to source signals is influenced by the length of the source relay lines. The longer a source relay line is, the higher the resistance with respect to source signals becomes. The shorter a source relay line is, the lower the resistance with respect to the source signals becomes. As shown in FIG. 7, the resistance with respect to source signals changes gradually in the lateral direction, and the resistance with respect to source signals does not change sharply.

Figure 8:
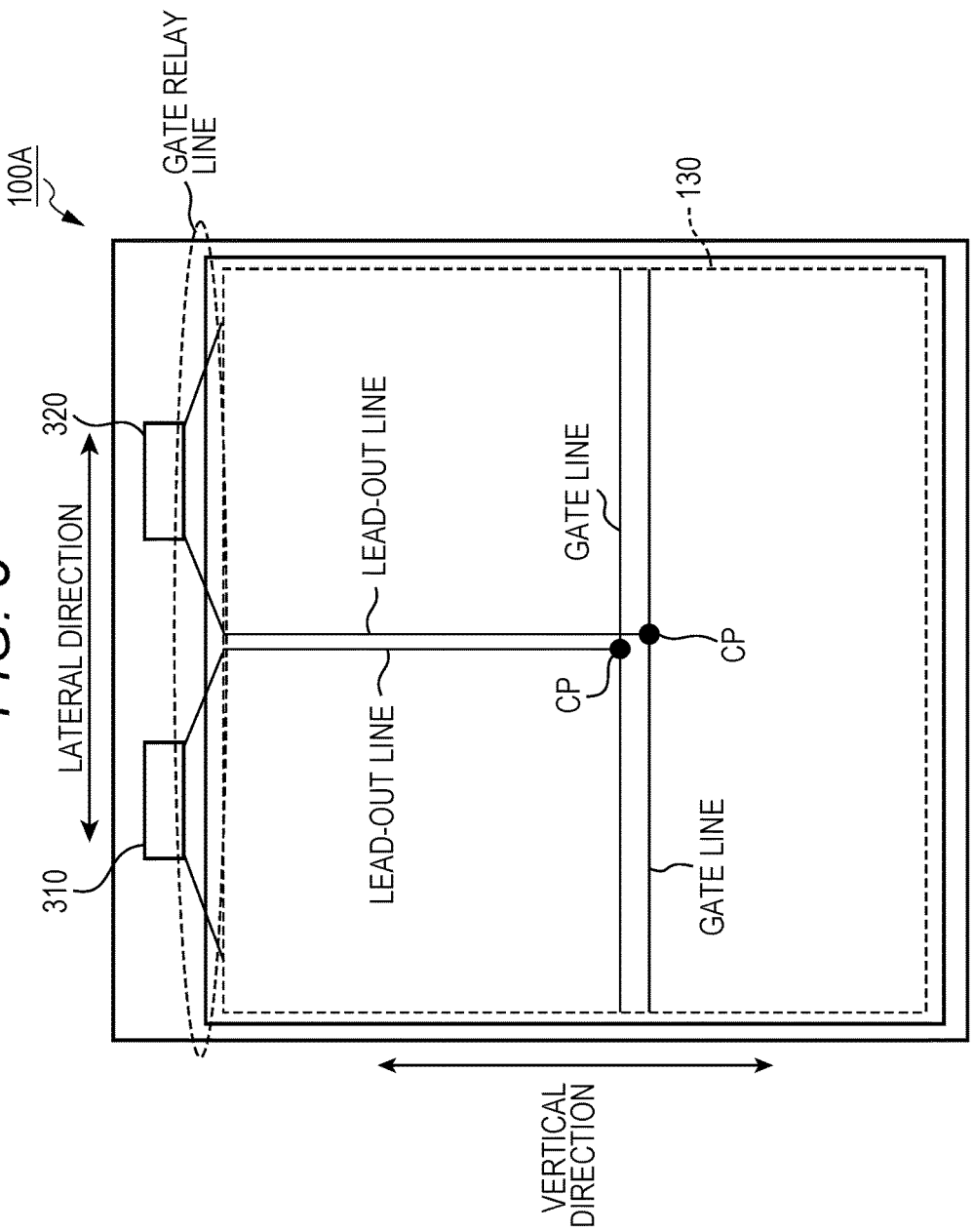
FIG. 8 is a schematic front view of the display device illustrated in FIG. 5.

FIG. 8 is a schematic front view of a display device 100A. The transmission of the gate signals is described with reference to FIG. 8.

Similar to the first embodiment, lead-out lines are arranged laterally in the display area 130. A part of the lead-out lines are shown in FIG. 8. The display device 100A includes gate relay lines which relay gate signals from the left gate driver 310 and the right gate driver 320 to the lead-out lines. Similar to the source relay lines, an area where gate relay lines extend from the left gate driver 310, and an area where gate relay lines extend from the right gate driver 320 expand in a fan-like shape from the left gate driver 310 and the right gate driver 320 to display area 130.

As described with reference to the first embodiment, each lead-out line connects electrically to a gate line via a connection part CP. Some of the gate lines arranged longitudinally are shown in FIG. 8. A signal transmission distance from the left gate driver 310 or the right gate driver 320 to a connection part CP has an effect on resistance with reference to gate signals. The longer the signal transmission distance is, the higher the resistance with respect to gate signals becomes. The shorter the signal transmission distance is, the lower the resistance with respect to gate signals becomes. The location of connection parts CP is designed such that the positional fluctuation of the signal transmission distance can become small.

A connection part CP may be located such that a lead-out line connecting to a long gate relay line is arranged to connect to a gate line which is close to the arrangement area. In this case, as a distance between a jointing point JP which connects a lead-out line and a gate relay line, and a connection part CP is made short, the signal transmission distance does not become too long.

A connection part CP may be located such that a lead-out line connecting to a short gate relay line is arranged to connect to a gate line which is far from the arrangement area. In this case, as a distance between the jointing point JP which connects a lead-out line and a gate relay line, and a connection part CP is made long, the signal transmission distance does not become too short.

As described above, as the location of a connection part CP is designed properly in accordance with a length of the gate relay line, the difference in transmission span of gate signals is made small. In the present embodiment, the long gate relay line described above is exemplified as a first gate relay line. The short gate relay line described above is exemplified as a second gate relay line. The lead-out line connecting to the long gate relay line is exemplified as a first lead-out line. The lead-out line connecting to the short gate relay line is exemplified as a second lead-out line. The jointing point JP connecting between the long gate relay line and the first lead-out line is exemplified as a first jointing point. The jointing point JP connecting between the short gate relay line and the second lead-out line is exemplified as a second jointing point. The connection part connecting the first lead-out line and the corresponding gate line is exemplified as a first connection part CP. The connection part connecting the second lead-out line and the corresponding gate line is exemplified as a second connection part CP.

Figure 9:
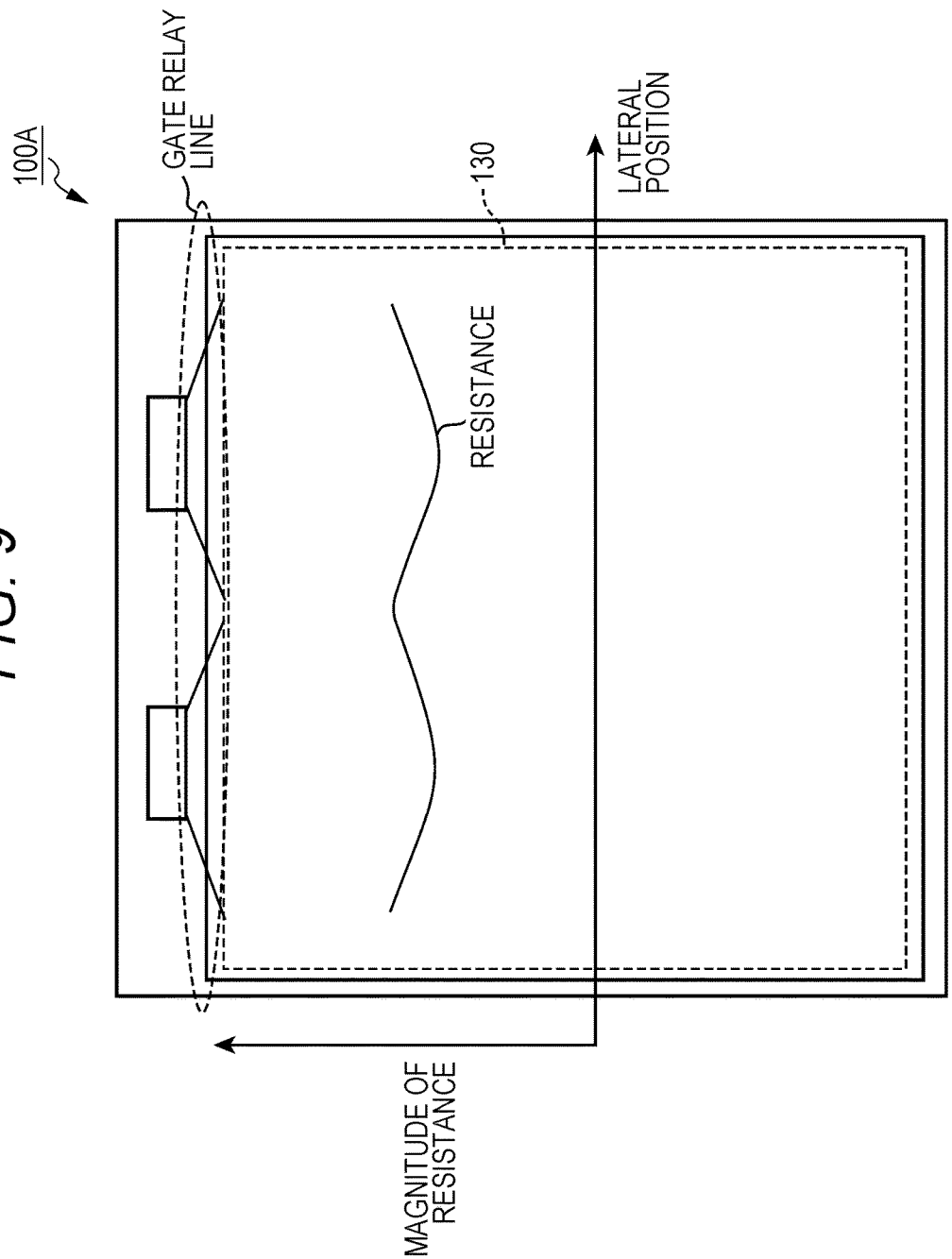
FIG. 9 is a schematic front view of the display device illustrated in FIG. 5.

FIG. 9 is a schematic front view of the display device 100A. A positional fluctuation in resistance with respect to gate signals is described with reference to FIG. 9.

A graph of resistance in lateral distribution with respect to gate signals affected by the length of the gate relay lines is illustrated in FIG. 9 along with the display device 100A. The curved line on the display area 130 represents a magnitude of resistance with respect to gate signals.

A length of a gate relay line has effects on resistance with reference to gate signals. The longer a gate relay line is, the higher a resistance with respect to gate signals becomes. The shorter a gate relay line is, the lower the resistance with respect to gate signals becomes. As shown in FIG. 9, the resistance with respect to source signals changes gradually in the lateral direction, and the resistance with respect to gate signals does not change sharply.

Third Embodiment

As described with reference to the first embodiment and the second embodiment, gate signals are emitted to gate lines via lead-out lines, and the resistance with respect to gate signals due to lead-out lines is likely to be higher with comparison to source signals. When a gate driver is arranged closer to the display area than a source driver, the resistance with respect to gate signals is lower because the length of a gate relay line is made short. The techniques of decrease in resistance with respect to gate signals are described with reference to the third embodiment.

Figure 10:
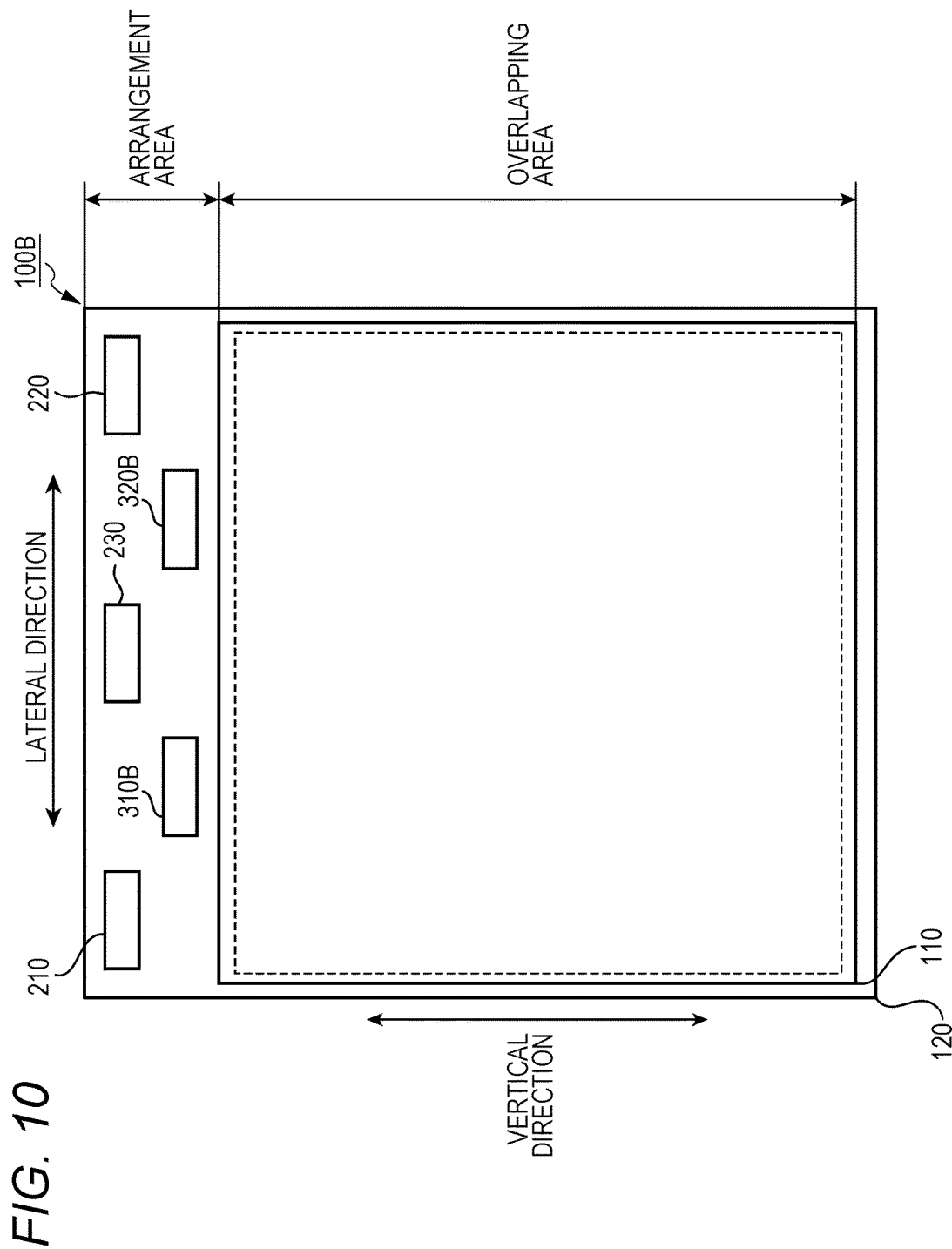
FIG. 10 is a schematic front view of a display device of a third embodiment.

FIG. 10 is a schematic front view of a display device 100B of the third embodiment. A display device 100B is described with reference to FIG. 10. Common reference numbers between the second embodiment and the third embodiment are labeled on elements which have the same or similar functions as that in the second embodiment. Thus, the description in the second embodiment is referred to for such elements.

Similar to the second embodiment, the display device 100B includes the outer substrate 110, the inner substrate 120, the left source driver 210, the right source driver 220 and the central source driver 230. The display device 100B further includes a left gate driver 310B and a right gate driver 320B.

Similar to the second embodiment, the left source driver 210, the right source driver 220, the central source driver 230, the left gate driver 310B and the right gate driver 320B are arranged on the arrangement area. The lateral positions of the left gate driver 310B and the right gate driver 320B are the same as the second embodiment. Namely, the left gate driver 310B is arranged between the left source driver 210 and the central source driver 230 in the lateral direction, and the right gate driver 310B is arranged between the right source driver 220 and the central source driver 230 in the lateral direction.

A difference as compared to the second embodiment is that the longitudinal positions of the left gate driver 310B and the right gate driver 320B are different from those of the left source driver 210, the right source driver 220 and the central source driver 230. Namely, the left gate driver 310B and the right gate driver 320B are arranged closer to the overlapping area than the left source driver 210, the right source driver 220 and the central source driver 230. Therefore, the resistance due to the gate relay lines with respect to gate signals in this embodiment is lower than that in the first embodiment and the second embodiment. In addition, as the longitudinal positions of the left gate driver 310B and the right gate driver 320B are different from the left source driver 210, the right source driver 220 and the central source driver 230, the size and number of the left source driver 210, the right source driver 220, the central source driver 230, the left gate driver 310B and the right gate driver 320B are less restrictive. In the present embodiment, one of the left gate driver 310B and the right gate driver 320B is exemplified as a gate driver.

Fourth Embodiment

The principle of arrangement of drivers with reference to the third embodiment may include a large number of drivers being concentrated. A display device with a large number of drivers being concentrated is described with reference to the fourth embodiment.

Figure 11:
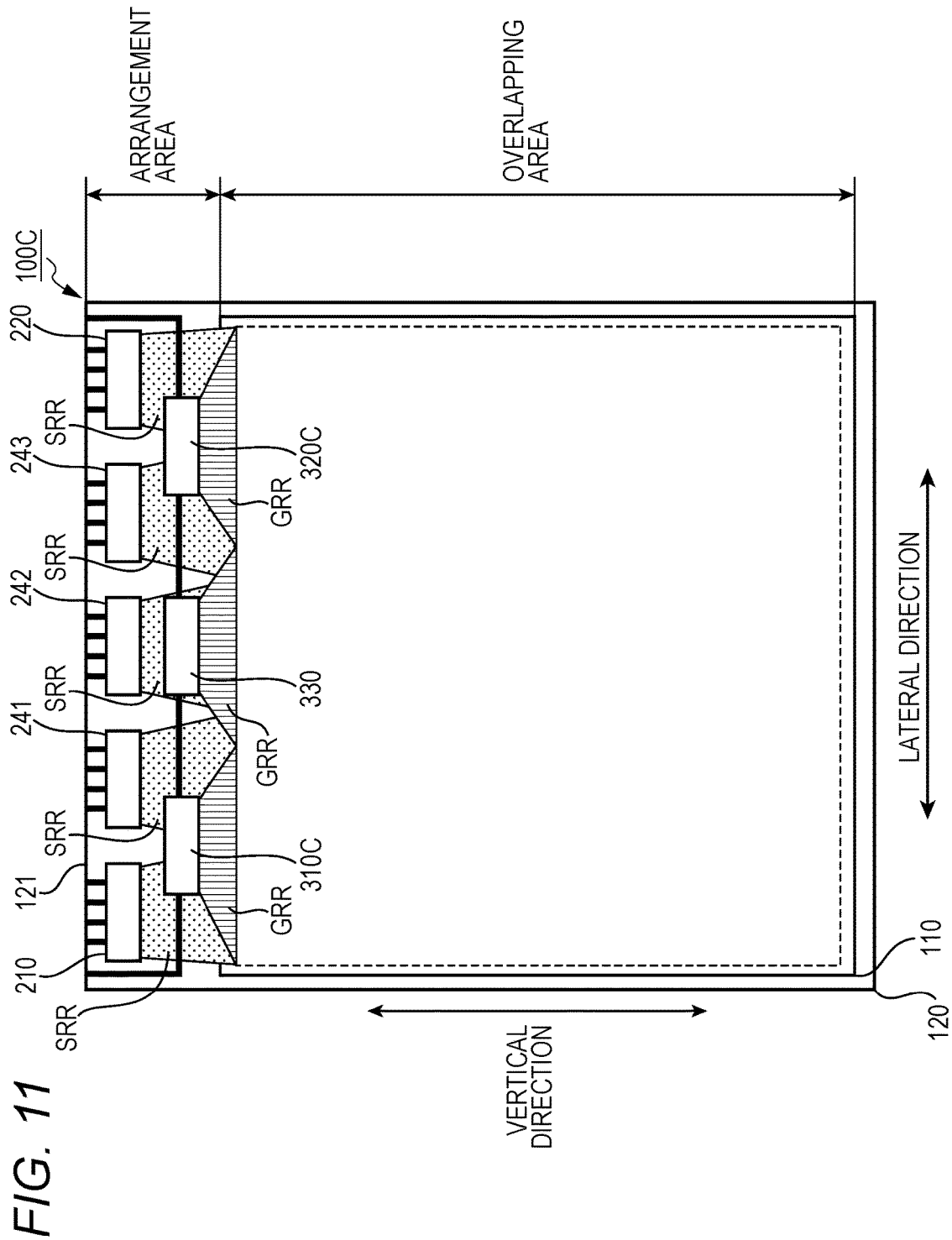
FIG. 11 is a schematic front view of the display device of a fourth embodiment.

FIG. 11 is a schematic front view of a display device 100C of the fourth embodiment. The display device 100C is described with reference to FIG. 11. Common reference numbers between the third embodiment and the fourth embodiment are labeled on elements which have the same or similar functions as that in the third embodiment. Thus, description in the third embodiment is referred to for such elements.

Similar to the third embodiment, the display device 100C includes the outer substrate 110, the inner substrate 120, the left source driver 210 and the right source driver 220. The display device 100C further includes a first central source driver 241, a second central source driver 242 and a third central source driver 243. The left source driver 210, the first central source driver 241, the second central source driver 242, the third central source driver 243 and the right source driver 220 are arranged laterally.

The first central source driver 241 is arranged between the left source driver 210 and the second central source driver 242. The second central source driver 242 is arranged between the first central source driver 241 and the third central source driver 243. The third central source driver 243 is arranged between the second central source driver 242 and the right source driver 220.

The display device 100C further includes a left gate driver 310C, a right gate driver 320C and a central gate driver 330. The left gate driver 310C, the right gate driver 320C and the central gate driver 330 are arranged laterally. The left gate driver 310C is arranged between the left source driver 210 and the first central source driver 241 in the lateral direction. The right gate driver 320C is arranged between the right source driver 220 and the third central source driver 243 in the lateral direction. The central gate driver 330 is arranged between the left gate driver 310C and the right gate driver 320C.

The left gate driver 310C, the right gate driver 320C and the central gate driver 330 are arranged closer to the overlapping area than the left source driver 210, the first central source driver 241, the second central source driver 242, the third central source driver 243 and the right source driver 220. The left source driver 210, the first central source driver 241, the second central source driver 242, the third central source driver 243 and the right source driver 220 are arranged closer to the upper edge 121 of the inner substrate 120 than the left gate driver 310C, the right gate driver 320C and the central gate driver 330.

Each of the left source driver 210, the first central source driver 241, the second central source driver 242, the third central source driver 243 and the right source driver 220 includes a greater number of input terminals than the left gate driver 310C, the right gate driver 320C and the central gate driver 330. Thus, as the left source driver 210, the first central source driver 241, the second central source driver 242, the third central source driver 243 and the right source driver 220 are arranged closer to the upper edge 121 of the inner substrate 120, it is easy to design input routes of signals into the left source driver 210, the first central source driver 241, the second central source driver 242, the third central source driver 243 and the right source driver 220.

Each of the left gate driver 310C, the right gate driver 320C and the central gate driver 330 includes a smaller number of input terminals than each of the left source driver 210, the first central source driver 241, the second central source driver 242, the third central source driver 243 and the right source driver 220. Therefore, input routes of signals into the left gate driver 310C, the right gate driver 320C and the central gate driver 330 may be designed such that they encompass an area on which the left source driver 210, the first central source driver 241, the second central source driver 242, the third central source driver 243 and the right source driver 220 are arranged.

Figure 12:
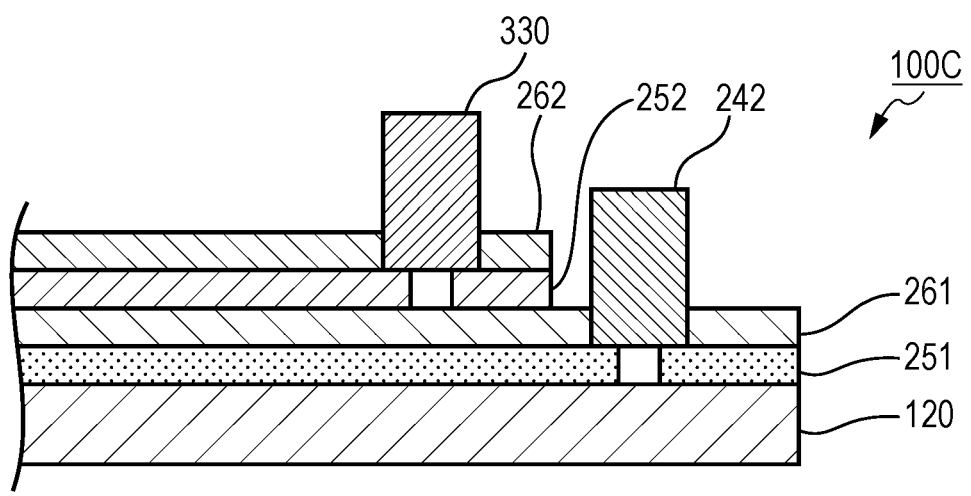
FIG. 12 is a cross-sectional view schematically showing the arrangement structure of the display device illustrated in FIG. 11.

FIG. 12 is a cross-sectional view schematically showing the arrangement structure of the display device 100C taken along a cutting line passing through the second central source driver 242 and the central gate driver 330. The display device 100C is further described with reference with FIG. 11 and FIG. 12.

The display device 100C includes a first conductive layer 251, a first insulating layer 261, a second conductive layer 252 and a second insulating layer 262. The first conductive layer 251 is laminated on the inner substrate 120. The first conductive layer 251 is used to form input routes of signals to the second central source driver 242 and other source drivers and source relay lines. The first insulating layer 261 is laminated on the first conductive layer 251. The second conductive layer 252 is laminated on the first insulating layer 261. The second conductive layer 252 is insulated electrically from the first conductive layer 251. The second conductive layer 252 is used to form input routes of signals to the central gate driver 330 and other gate drivers and the gate relay lines. In the present embodiment, the first insulating layer 261 is exemplified as an insulating layer.

FIG. 11 shows five source relay regions SRR on which the source relay lines are arranged. The left source driver 210, the first central source driver 241, the second central source driver 242, the third central source driver 243 and the right source driver 220 are arranged on these five source relay regions SRR, respectively.

FIG. 11 shows three gate relay regions GRR on which the gate relay lines are arranged. The left gate driver 310C, the right gate driver 320C and the central gate driver 330 are arranged on these three gate relay regions GRR, respectively.

The first insulating layer 261 insulates the gate relay lines formed on the gate relay regions GRR from the source relay lines on the source relay regions SRR.

The left gate driver 310C, the right gate driver 320C and the central gate driver 330 may be arranged on the first insulating layer 261 and overlap the source relay regions SRR. The left gate driver 310C, the right gate driver 320C and the central gate driver 330 overlap at least a part of the source relay lines arranged on the source relay regions SRR in plan view, and are insulated properly from the source relay lines by the first insulating layer 261.

Fifth Embodiment

The insulating techniques described with reference to the fourth embodiment enable the source relay lines and the gate relay lines to cross three-dimensionally. In general, an insulating performance of insulating layers is likely to decrease due to an ambient air outside of the display device. A reduction in the insulating performance between the source relay lines and the gate relay lines may cause a display device to display images improperly. In the fifth embodiment, techniques for maintaining the insulating performance between the source relay lines and the gate relay lines are described.

Figure 13:
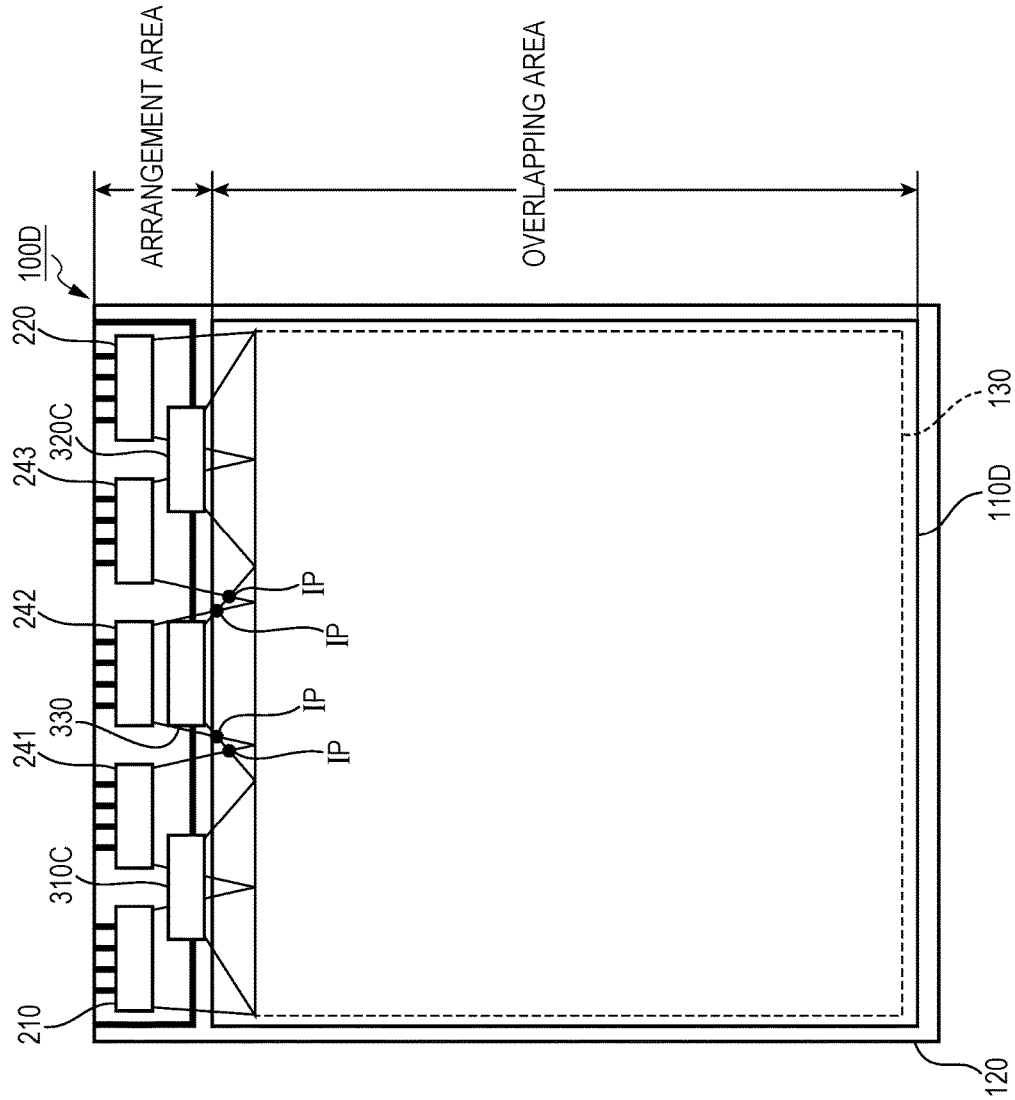
FIG. 13 is a schematic front view of a display device of a fifth embodiment.

FIG. 13 is a schematic front view of a display device 100D of the fifth embodiment. The display device 100D is described with reference to FIG. 13. Common reference numbers between the fourth embodiment and the fifth embodiment are labeled on elements which have the same or similar functions as that in the fifth embodiment. Thus, the description in the fifth embodiment is referred to for such elements.

Similar to the fourth embodiment, the display device 100D includes the inner substrate 120, the left source driver 210, the right source driver 220, the first central source driver 241, the second central source driver 242, the third central source driver 243, the left gate driver 310C, the right gate driver 320C and the central gate driver 330. The display device 100D further includes the outer substrate 110D. Similar to the fourth embodiment, the outer substrate 110D includes a display area 130. In the present embodiment, the outer substrate 110D is exemplified as a first substrate.

FIG. 13 shows overlapping points IP at which the source relay lines and the gate relay lines overlap three-dimensionally. Similar to the fourth embodiment, the gate relay lines are insulated from the source relay lines by an insulating layer.

The overlapping points IP are formed in the overlapping area which is covered by the outer substrate 110D. Thus, at the overlapping points IP, the insulating layer is protected from ambient air by the outer substrate 110D.

Sixth Embodiment

In various aforementioned embodiments, the gate signals are emitted to the gate lines via the lead-out lines. Thus, the transmission route of gate signals is likely to be longer than that of source signals, which may lead to a large resistance fluctuation with respect to gate signals. Techniques of lessening a difference in resistance fluctuation with respect to gate signals are described with reference to the sixth embodiment.

Figure 14:
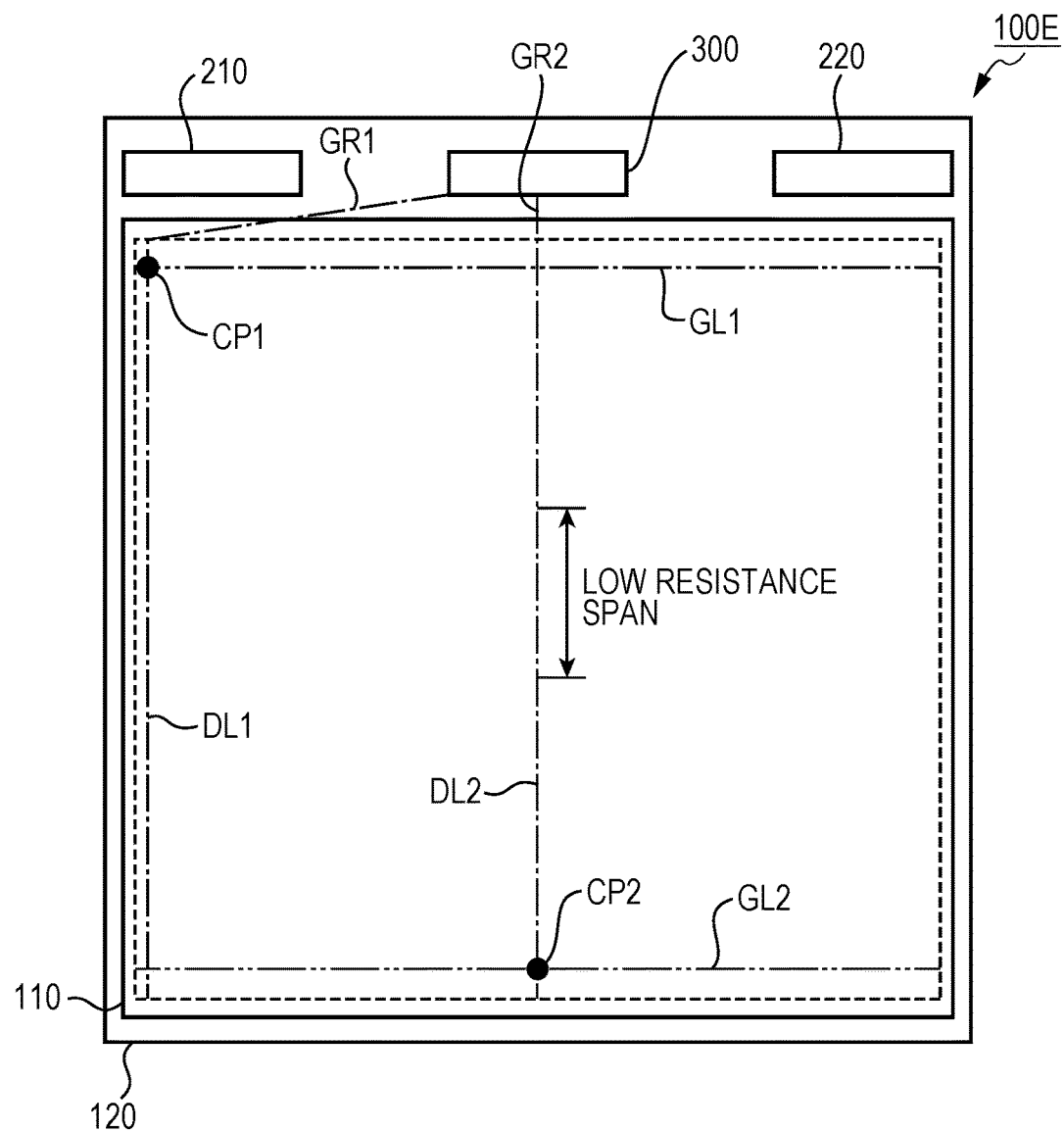
FIG. 14 is a schematic front view of a display device of a sixth embodiment.

FIG. 14 is a schematic front view of a display device 100E of the sixth embodiment. The display device 100E is described with reference to FIG. 14. Common reference numbers between the first embodiment and the sixth embodiment are labeled on elements which have the same or similar functions as that in the first embodiment. Thus, the description in the first embodiment is referred to for such elements.

Similar to the first embodiment, the display device 100E includes the outer substrate 110, the inner substrate 120, the left source driver 210, the right source driver 220 and the gate driver 300. The display device 100E further includes the source lines, the gate lines and the lead-out lines. Wiring structures of the source lines, the gate lines and the lead-out lines are the same as the first embodiment.

FIG. 14 shows a lead-out line DL1 and a lead-out line DL2. The lead-out line DL1 is arranged the most distant from the gate driver 300 among the lead-out lines. The lead-out line DL2 is arranged closer to the gate driver 300 than the lead-out line DL1. FIG. 14 further shows a gate relay line GR1 and a gate relay line GR2. The gate relay line GR1 connects to the lead-out line DL1. The gate relay line GR2 connects to the lead-out line DL2. FIG. 14 further shows a gate line GL1 which is arranged the closest to the gate driver 300 among the gate lines, and a gate line GL2 which is located more distant from the gate driver 300 than the gate line GL1. FIG. 14 further shows a connection part CP1 and a connection part CP2. The gate line GL1 is electrically connected to the lead-out line DL1 at the connection part CP1. The gate line GL2 electrically connects to the lead-out line DL2 at the connection part CP2. In the present embodiment, the gate relay line GR1 is exemplified as a first gate relay line, and the gate relay line GR2 is exemplified as a second gate relay line.

One signal transmission route is formed by a group of the lead-out line DL1 which is distant from the gate driver 300 and the gate line GL1 which is close to the gate driver 300. Another signal transmission route is formed by a group of the lead-out line DL2 which is close to the gate driver 300 and the gate line GL2 which is distant from the gate driver 300. This route formation can reduce a fluctuation of a length of signal transmission route. On the other hand, a signal transmission route formed by the group of the lead-out line DL2 and the gate line GL2 is much longer than that formed by the group of the lead-out line DL1 and the gate line GL1. In the present embodiment, the lead-out line DL1 is exemplified as a first lead-out line, and the lead-out line DL2 is exemplified as a second lead-out line. The signal transmission route formed by the group of the lead-out line DL1 and the gate line GL1 is exemplified as a first transmission span. Signal transmission route formed by the group of the lead-out line DL2 and the gate line GL2 is exemplified as a second transmission span.

The signal transmission route formed by the group of the lead-out line DL2 and the gate line GL2 at least partially includes a low resistance span which is a lower ratio of electric resistance than the signal transmission route formed by the group of the lead-out line DL1 and the gate line GL1. As a result, the difference is made small between the resistance with respect to gate signals which transmit through the signal transmission route formed by the lead-out line DL2 and gate line GL2 and the resistance with respect to gate signals which transmit through the signal transmission route formed by the lead-out line DL1 and gate line GL1.

Figure 15:
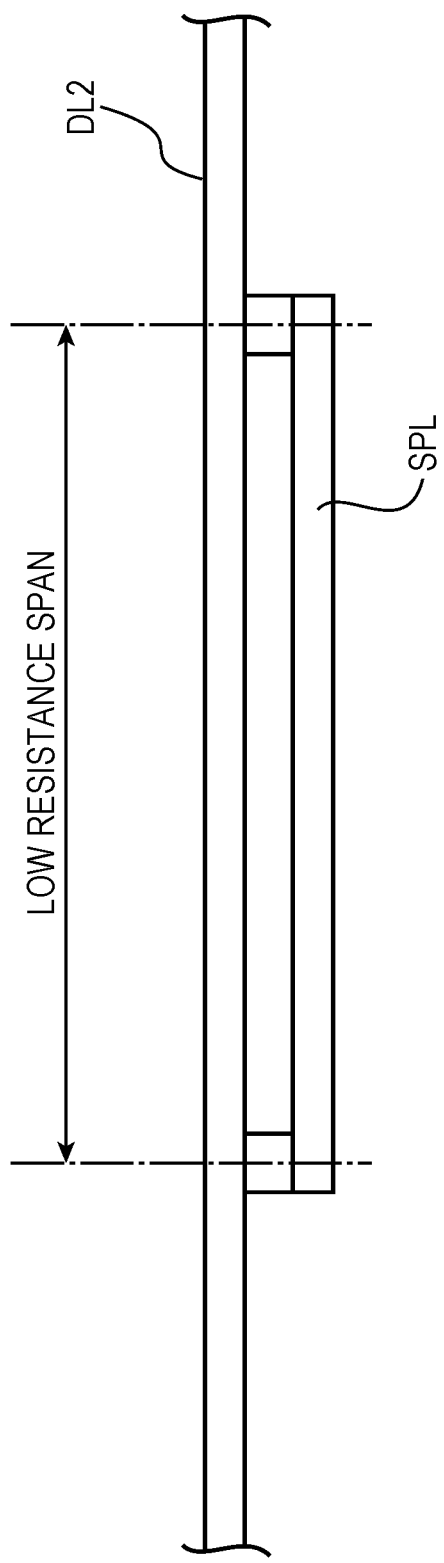
FIG. 15 is an exemplary schematic view showing a low resistance span provided in the display device illustrated in FIG. 14.

FIG. 15 is an exemplary schematic view showing the low resistance span. The low resistance span is described with reference to FIG. 14 and FIG. 15.

The display device 100E includes a supplemental line SPL which is formed in a different layer than the lead-out line DL2. The lead-out line DL2 and the supplemental line SPL transmit gate signals in parallel in the low resistance span, which can lead to reduction of resistance with respect to gate signals.

The low resistance span formed by double lines can be provided in more than one signal transmission route. A short low resistance span (double-line span) may be provided in a short signal transmission route. A long low resistance span (double-line span) may be provided in a long signal transmission route. In this case, the short signal transmission route is exemplified as a first transmission span, and the long signal transmission route is exemplified as a second transmission span.

Note that technology regarding an exemplary display device in the specific embodiments described above mainly includes the following features.

In one general aspect, the instant application describes a display device that includes a plurality of source drivers for emitting source signals, at least one gate driver for emitting gate signals, a first substrate having a display area for displaying images, the images represented by source signals and gate signals, a second substrate including a first area overlapping with the first substrate, and a second area on which the plurality of source drivers and the at least one gate driver are attached. A plurality of gate lines extend in a first direction on the first area, a plurality of source lines extend in a second direction which is different from the first direction, and a plurality of lead-out lines extend in the second direction. A plurality of connection parts are provided, each of the plurality of connection parts connecting one of the plurality of lead-out lines to one of the plurality of gate lines. The gate signals are emitted from the gate driver to the plurality of gate lines via the plurality of lead-out lines and the plurality of connection parts. The plurality of source drivers include a first source driver and a second source driver, the second source driver being spaced apart from the first source driver in the first direction. The gate driver is located between the first source driver and second source driver in the first direction.

According to this configuration, because a plurality of source drivers and a gate driver can be concentrated in the second area, the display area can be made bigger. As gate signals are emitted from a gate driver to a gate line via a lead-out line and a connection part, and a source signal is emitted to a source line extending in a second direction that is the same as the lead-out line, the display device can display images in a wide display area.

The above general aspect may include one or more of the following features. The display device may further include a plurality of drivers. The plurality of drivers may include the plurality of source drivers and the gate driver arranged on the second area. The plurality of drivers may be arranged in the first direction. One end of the plurality of drivers arranged in the first direction is the first source driver. The other end of the plurality of drivers is the second source driver.

According to this configuration, without sharp positional fluctuation of wiring resistance, wiring from gate drivers can be designed, and a display device can display high quality images in the display area.

The gate driver may be located closer to the first area than the plurality of source drivers.

According to this configuration, as the gate driver is located closer to the first area than the source drivers, a low resistance for gate signals can be achieved.

The display device may further include a plurality of source relay lines for transmitting source signals from the plurality of source drivers to the plurality of source lines, a plurality of gate relay lines for transmitting gate signals from the gate driver to the plurality of lead-out lines and an insulating layer for insulating the plurality of source relay lines from the plurality of gate relay lines. The gate driver may overlap with at least one of the plurality of source relay lines.

According to this configuration, the gate driver is arranged on the insulating layer and overlaps with at least one of a plurality of source relay lines. And a position of the gate driver can be designed properly irrespective of a position of source relay lines.

At least one of the plurality of source relay lines and at least one of the plurality of gate relay lines may overlap in the first area.

According to this configuration, the source relay line and at least one of the gate relay lines overlap in the first area. And the source relay lines and gate relay lines are protected properly by the first substrate.

Each of the plurality of lead-out lines may electrically connect to a respective one of the gate relay lines at one of a plurality of jointing points. The plurality of gate relay lines may include a first gate relay line, and a second gate relay line being shorter than the first gate relay line. The plurality of lead-out lines may include a first lead-out line connecting to the first gate relay line and a second lead-out line connecting to the second gate relay line. The plurality of gate lines may include a first gate line and a second gate line, the plurality of connection parts include a first connection part connecting the first lead-out line to the first gate line and a second connection part connecting the second lead-out line to the second gate line. The plurality of jointing points may include a first jointing point and a second jointing point, the first gate relay line electrically connecting to the first lead-out line at the first jointing point and the second gate relay line electrically connecting to the second lead-out line at the second jointing point. A distance from the first jointing point to the first connection part may be shorter than a distance from the second jointing point to the second connection part.

According to this configuration, the connection parts can be designed properly depending on the configuration of the display device.

The plurality of gate relay lines may include a first gate relay line and a second gate relay line. The plurality of lead-out lines may include a first lead-out line connecting to the first gate relay line and a second lead-out line connecting to the second gate relay line. The first gate relay line and the first lead-out line may transmit gate signals in a first transmission span. The second gate relay line and the second lead-out line may transmit gate signals in a second transmission span being longer than the first transmission span. At least a part of the second transmission span may have a lower ratio of electric resistance per unit of length than the first transmission span.

According to this configuration, the ratio of electric resistance per unit of length in the second transmission span, which is longer than the first transmission span is set lower than the first transmission span. Thus, and a difference in electric resistance between the first transmission span and the second transmission span can decrease.

The second transmission span may include a double-line span. The double-line span may have two lines transmitting gate signals in parallel.

According to this configuration, the second transmission span includes the double-line span which is lower in the ratio of electric resistance per unit of length than the single-line span. Thus, a difference in electric resistance between the first transmission span and the second transmission span can decrease.

The first transmission span may include a double-line span. The double-line span of the second transmission span may be longer than the double-line span of the first transmission span.

According to this configuration, the double-line span in the second transmission span is longer than that in the first transmission span, and a difference in electric resistance between the first transmission span and the second transmission span can decrease.

The principles of the first to sixth embodiments can be preferably applied to a display device that displays pictures.

Although the present invention has been fully described by way of example with reference to the accompanying drawings, it is to be understood that various changes and modifications will be apparent to those skilled in the art. Therefore, unless such changes and modifications depart from the scope of the present invention hereinafter defined, they should be construed as being included therein.

What is claimed is:

1. A display device, comprising:
a plurality of source drivers for emitting source signals;
at least one gate driver for emitting gate signals;
a first substrate having a display area for displaying images, the images represented by source signals and gate signals;
a second substrate including a first area overlapping with the first substrate, and a second area on which the plurality of source drivers and the at least one gate driver are attached;
a plurality of gate lines extending in a first direction on the first area;
a plurality of source lines extending in a second direction which is different from the first direction;
a plurality of lead-out lines extending in the second direction;
a plurality of connection parts, each of the plurality of connection parts connecting one of the plurality of lead-out lines to one of the plurality of gate lines;
a plurality of source relay lines for transmitting source signals from the plurality of source drivers to the plurality of source lines;
a plurality of gate relay lines for transmitting gate signals from the gate driver to the plurality of lead-out lines; and
an insulating layer for insulating the plurality of source relay lines from the plurality of gate relay lines, wherein
the gate driver overlaps with at least one of the plurality of source relay lines,
the gate signals are emitted from the gate driver to the plurality of gate lines via the plurality of lead-out lines and the plurality of connection parts,
the plurality of source drivers include a first source driver and a second source driver, the second source driver being spaced apart from the first source driver in the first direction,
the gate driver is located between the first source driver and second source driver in the first direction, and
the gate driver is located closer to the first area than the plurality of source drivers.

2. The display device according to claim 1, wherein
at least one of the plurality of source relay lines and at least one of the plurality of gate relay lines overlap in the first area.

3. The display device according to claim 1, wherein
each of the plurality of lead-out lines electrically connects to a respective one of the gate relay lines at one of a plurality of jointing points,
the plurality of gate relay lines include a first gate relay line, and a second gate relay line being shorter than the first gate relay line,
the plurality of lead-out lines include a first lead-out line connecting to the first gate relay line, and a second lead-out line connecting to the second gate relay line,
the plurality of gate lines include a first gate line and a second gate line,
the plurality of connection parts include a first connection part connecting the first lead-out line to the first gate line, and a second connection part connecting the second lead-out line to the second gate line,
the plurality of jointing points include a first jointing point and a second jointing point, the first gate relay line electrically connecting to the first lead-out line at the first jointing point, and the second gate relay line electrically connecting to the second lead-out line at the second jointing point, and
a distance from the first jointing point to the first connection part is shorter than a distance from the second jointing point to the second connection part.

4. The display device according to claim 1, wherein
the plurality of gate relay lines include a first gate relay line and a second gate relay line,
the plurality of lead-out lines include a first lead-out line connecting to the first gate relay line, and a second lead-out line connecting to the second gate relay line,
the first gate relay line and the first lead-out line transmit gate signals in a first transmission span,
the second gate relay line and the second lead-out line transmit gate signals in a second transmission span being longer than the first transmission span, and
at least a part of the second transmission span has a lower ratio of electric resistance per unit of length than the first transmission span.

5. The display device according to claim 4, wherein
the second transmission span includes a double-line span, the double-line span having two lines transmitting gate signals in parallel.

6. The display device according to claim 5, wherein
the first transmission span includes a double-line span, and
the double-line span of the second transmission span is longer than the double-line span of the first transmission span.

* * * * *